United States Patent [19]

Johnson et al.

[11] Patent Number: 4,670,635

[45] Date of Patent: Jun. 2, 1987

[54] MULTI-ELECTRODE ELECTRICAL DISCHARGE MACHINING APPARATUS

[75] Inventors: Myron C. Johnson, Freeland; Frederick L. Fitts, Ann Arbor, both of Mich.

[73] Assignee: Ex-Cell-O Corporation, Troy, Mich.

[21] Appl. No.: 639,546

[22] Filed: Aug. 10, 1984

[51] Int. Cl.⁴ .............................................. B23H 1/04
[52] U.S. Cl. .................................................. 219/69 E
[58] Field of Search .............. 219/69 E, 69 V; 314/1, 314/4, 5; 373/94; 313/236, 237; 29/568, 26 A, 36, 39; 408/35

[56] References Cited

U.S. PATENT DOCUMENTS

| Re. 29,398 | 9/1977 | Inoue | 219/69 G |
|---|---|---|---|
| 2,427,588 | 9/1947 | Burnett | 219/69 E |
| 2,490,302 | 12/1949 | Holfelder | 219/69 V |
| 2,762,946 | 9/1956 | Manchester | 219/69 G |
| 2,989,616 | 6/1961 | Mironoff | 219/69 G |
| 3,167,632 | 1/1965 | O'Connor | 219/69 G |
| 3,203,071 | 8/1965 | Uchida | 408/35 |
| 3,222,494 | 12/1965 | O'Connor | 219/69 E |
| 4,038,740 | 8/1977 | Grinage | 29/568 |
| 4,316,071 | 2/1982 | Bonga | 219/69 R |
| 4,355,446 | 10/1982 | Shimajiri et al. | 29/26 A |
| 4,395,613 | 7/1983 | Barr et al. | 219/69 E |
| 4,404,449 | 9/1983 | Astier et al. | 219/69 V |
| 4,459,190 | 7/1984 | Inoue | 219/69 M |
| 4,479,044 | 10/1984 | Inoue et al. | 219/69 E |
| 4,614,020 | 9/1986 | Kawada et al. | 29/26 A |
| 4,621,407 | 11/1986 | Suzuki | 29/568 |

FOREIGN PATENT DOCUMENTS

| 2711697 | 9/1978 | Fed. Rep. of Germany | 219/69 G |
|---|---|---|---|
| 2838963 | 3/1980 | Fed. Rep. of Germany | 29/26 A |
| 2915265 | 10/1980 | Fed. Rep. of Germany | 219/69 E |
| 54-24379 | 2/1979 | Japan | 408/35 |
| 56-45349 | 4/1981 | Japan | 29/568 |
| 157922 | 12/1981 | Japan | 219/68 |
| 1605143 | 2/1982 | United Kingdom | 29/39 |
| 643274 | 1/1979 | U.S.S.R. | 219/69 R |

Primary Examiner—J. R. Scott
Assistant Examiner—Geoffrey S. Evans
Attorney, Agent, or Firm—John P. Moran

[57] ABSTRACT

An electrical discharge machine including a base frame having secured thereon a workpiece holding fixture and an upright frame member, a support member slidably mounted on the upright frame member, either one or two turrets indexably mounted on the support member, and a plurality of equally spaced electrode cartridge assemblies removably mounted on each turret. Each cartridge assembly includes an electrode guide and one or more electrodes extending through the electrode guide to a position just above a workpiece. A suitable drive unit moves the support member and turret and, hence, the cartridge assembly and electrodes toward and away from the workpieces to spark erode desired openings therein. A coupling assembly serves to disconnect and connect the respective electrode cartridge assemblies with respect to the drive unit and with respect to a source of air and electricity when the respective electrodes becomes worn and require replacement or when several assemblies are required to perform different operations.

5 Claims, 6 Drawing Figures

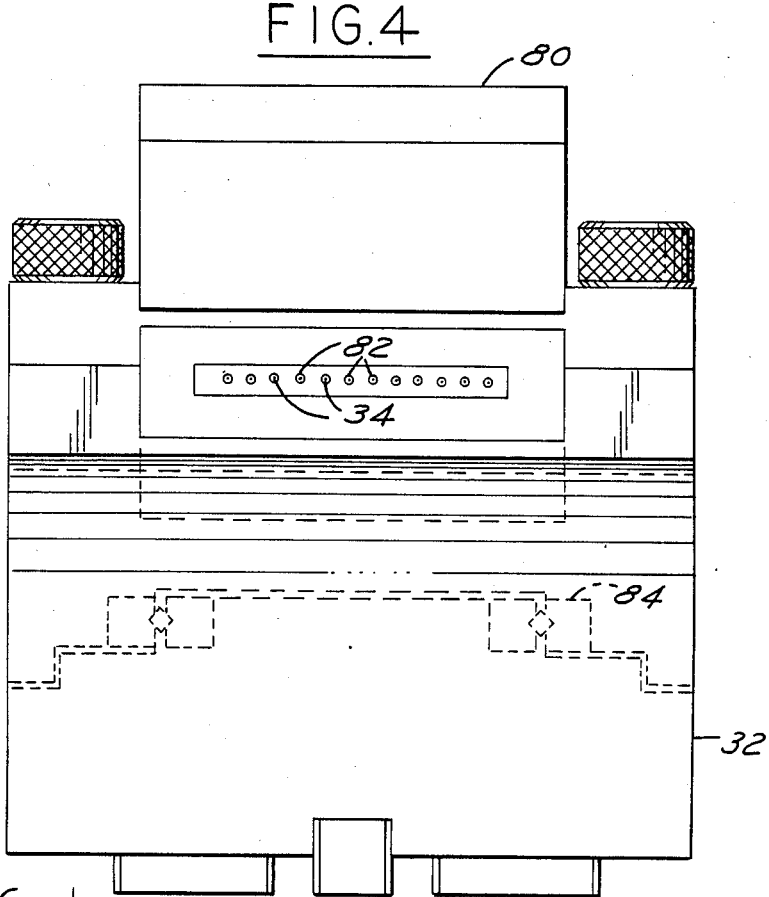
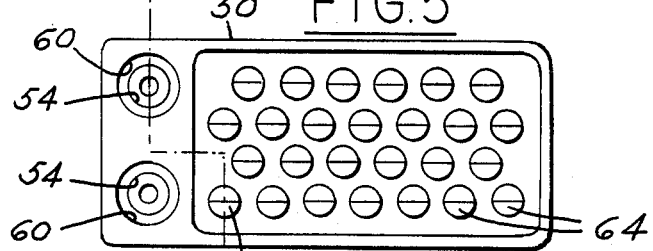
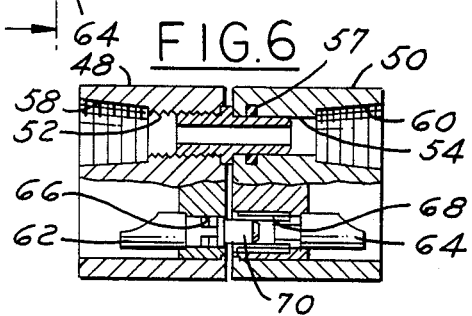

MULTI-ELECTRODE ELECTRICAL DISCHARGE MACHINING APPARATUS

TECHNICAL FIELD

This invention relates generally to electrical discharge machines and, more particularly, to such machines including at least one rotatable turret carrying a plurality of electrode cartridge assemblies.

BACKGROUND ART

Heretofore, electrical discharge machines have typically included a carriage mounted thereon for guided movement in a vertical direction, with either a single electrode or a pair of like or different electrodes removably mounted via suitable quick change means on the carriage. While such arrangements are satisfactory, it is desirable to incorporate means for mounting and indexing into operational position a plurality of single or double electrode cartridge assemblies on one electrical discharge machine, in order to eliminate having to remove and replace electrodes in a particular cartridge assembly each time the electrodes become worn or a different size or pattern is required.

DISCLOSURE OF THE INVENTION

Accordingly, a general object of the invention is to provide an improved electrical discharge machining apparatus having means for quickly providing new electrodes without having to remove worn electrodes.

Another object of the invention is to provide an electrical discharge machine having incorporated thereon a rotatable turret carrying a plurality of electrode cartridge assemblies.

A further object of the invention is to provide an electrical discharge machine including a pair of rotatable turrets, each carrying a plurality of electrode cartridge assemblies.

Still another object of the invention is to provide an electrical discharge machine including a base frame having secured thereon a workpiece holding fixture; an upright frame member mounted on the base frame; a support member slidably mounted on the upright frame member; a turret indexably mounted on the support member; a plurality of equally spaced electrode cartridge assemblies removably mounted on the turret, each of the cartridge assemblies including one or more electrodes extending therefrom to a position just above a workpiece in the holding fixture; drive means for moving the support member and turret and, hence, one of the cartridge assemblies and its one or more electrodes toward and away from the workpiece to spark erode a desired opening therein; and coupling means for disconnecting and connecting the respective cartridge assemblies with respect to the drive means and with respect to a source of air and electricity when there is a need to use different electrodes.

These and other objects and advantages will be apparent from the following description and accompanying drawings.

BRIEF DESCRIPTION OF THE DRAWINGS

FIG. 4 is an enlarged end view of the FIG. 3 structure;

FIG. 5 is a cross-sectional view taken along the line 5—5 of FIG. 3, and looking in the direction of the arrows; and FIG. 6 is a cross-sectional view taken along the line 6—6 of FIG. 5, as if FIG. 5 included both upper and lower blocks, and looking in the direction of the arrows.

BEST MODE OF CARRYING OUT THE INVENTION

Figure 1:
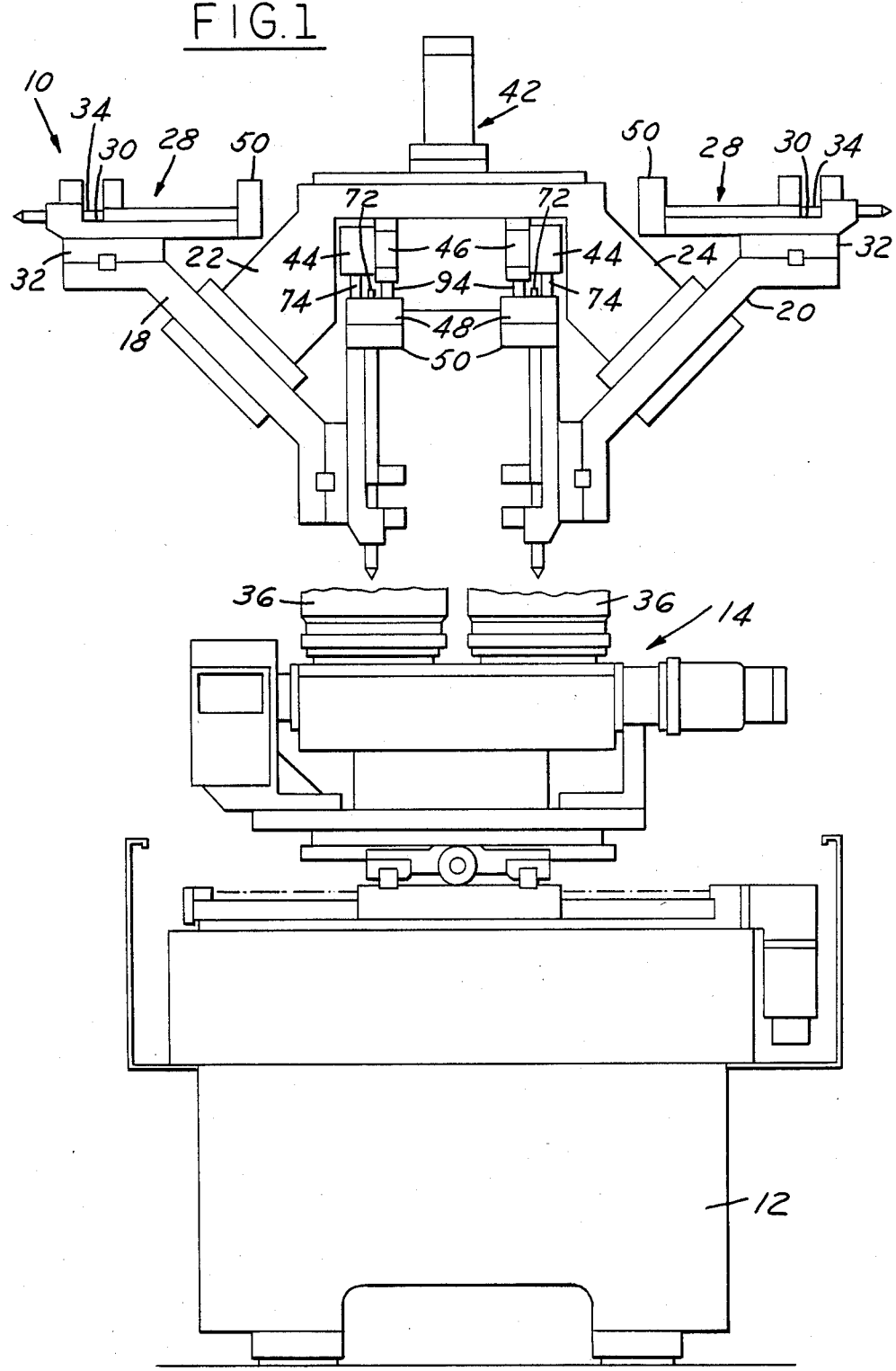
FIG. 1 is a front elevational view of a machine embodying the invention.
Figure 2:
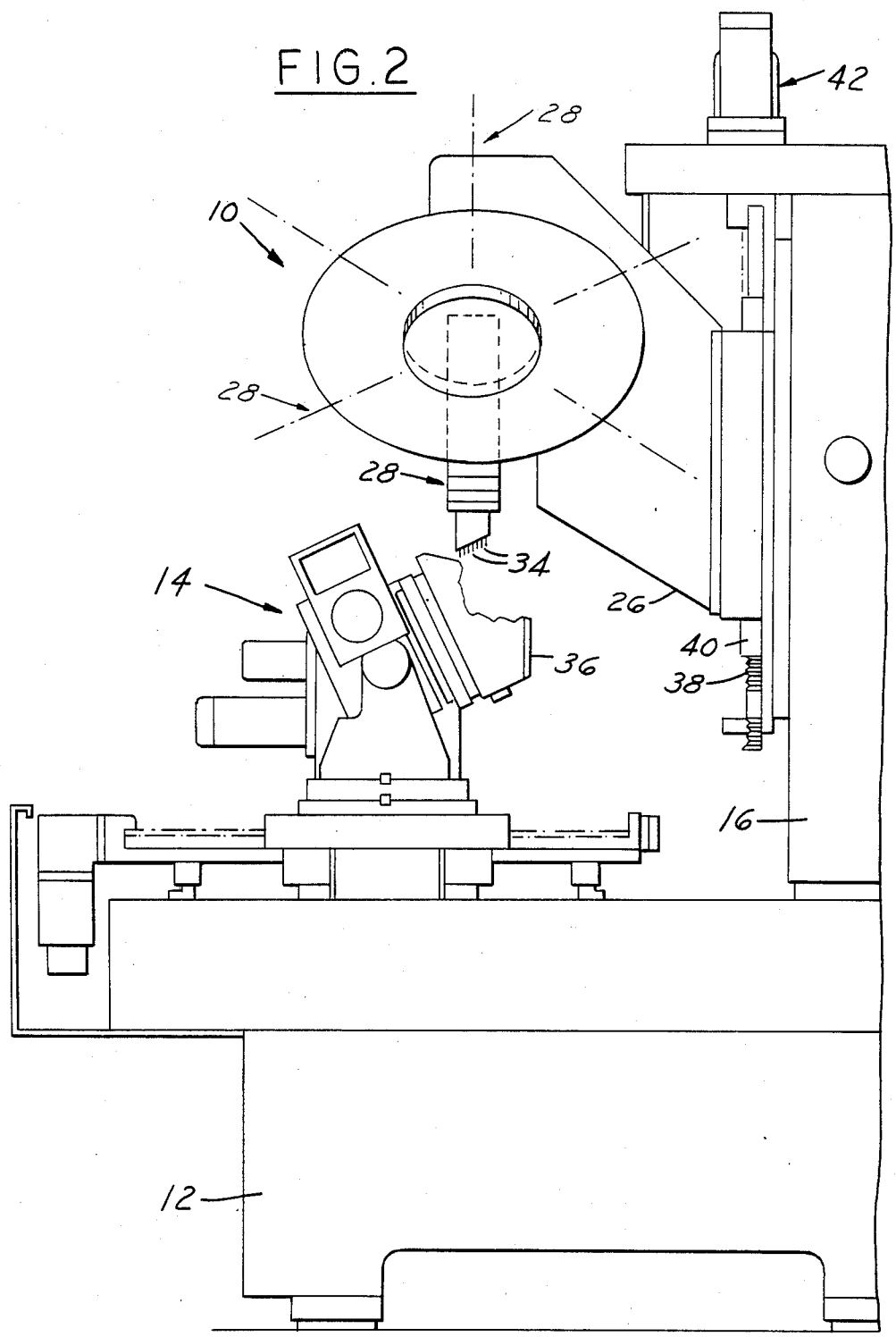
FIG. 2 is a side elevational view of the FIG. 1 structure.

Referring now to the drawings in greater detail, FIGS. 1 and 2 illustrate generally an electrical discharge machine 10 including a base frame 12 having a suitable workpiece fixture 14, e.g., the apparatus shown in Check et al U.S. Pat. No. 3,826,484, and an upright frame member 16 secured thereon, along with a control panel (not shown, but which may be mounted on the base frame 12 or on the upright frame member 16). A pair of indexable turrets 18 and 20 are each rotatably mounted on respective support arms 22 and 24 extending downwardly at any suitable angle, say, 45°, from oppositely disposed sides of a support member 26. The latter is slidably mounted in a vertical or Z axis on the upright frame member 16. A plurality, such as six, equally spaced electrode cartridge assemblies 28 are removably mounted on each turret. Each assembly 28 includes a magazine plate 30 slidably mounted on a wire guide plate 32 which is secured to the respective turret 18 or 20. One or more electrodes 34 are operatively mounted in each cartridge assembly 28, as will be explained, to extend therefrom in a predetermined pattern so as to perform selected machining operations on one of two workpieces 36 mounted in the holding fixtures 14 below the two vertically oriented cartridge assemblies 28.

The slidably mounted support member 26 on the upright frame member 16 serves to permit initially positioning the electrodes 34 a predetermined distance, say, 0.020 inches, above the workpiece 36 surfaces to be machined. More specifically, as shown in FIG. 2, an upright screw 38 is threadedly mounted in a nut portion 40 formed integral with the upright frame member 16 and is driven by a D.C. servo motor 42 mounted on the upright frame member 16, to operatively adjust the vertical position of the support member 26.

A pair of suitable cylinders 44 and 46, shown schematically in FIG. 1, are mounted on the upright frame member 16 for purposes to be described. An upper connector block 48 is operatively connected to the cylinder 44, whereas a lower connector block 50 is secured for rotation with each cartridge assembly 28. The blocks 48 and 50 have a plurality of aligned openings 52 and 54 (FIG. 6) formed therein, the openings 52 being threaded. Threaded flanged sleeves 56 are secured in the threaded openings 52, serving as alignment pins and providing communication between the blocks. An O-ring seal 57 is mounted in the lower block 50 for sealing around each sleeve 56 upon insertion of the latter into the opening 54. Threaded inlet and outlet openings 58 and 60 are formed at the outer faces of the respective blocks 48 and 50. Oppositely extending electrical contacts 62 and 64 are mounted in still other aligned openings 66 and 68 formed in the respective blocks 48 and 50 and inter-connected via a male connector 70 carried in the upper block 48. Suitable pneumatic supply lines 72 (FIG. 3) are secured in the threaded inlet openings 58 of the connector block 48, providing air under pressure from a suitable source (not shown) for a purpose to be described. A rod 74 from the cylinder 44 is secured to the upper face of the upper block 48.

Each electrode cartridge assembly 28 (FIG. 3) is pre-assembled to include the plate members 30 and 32. The wire guide plate 32 is formed of an electrically non-conducting material and secured by any suitable connector means 76 to a respective turret 18 or 20. An electrode guide 78 is secured in the plate 32 by suitable clamping means 80, with electrodes 34 extending through openings 82 (FIG. 4) formed therein. The magazine plate 30 is slidably mounted on the wire guide plate 32 by means of a suitable cross roller slide, represented at 84. A contact block 86 and magazine assembly 88 are secured to the plate 30 by suitable clamping means 90. The components 86 and 88 may be interchanged for different sizes and/or different patterns of electrodes 34. The components 30, 86 and 88 are caused to slide relative to the plate 32 to provide electrodes 34, as required, for extension through the electrode guide 78. The clamping means 80 and 90 are actuated by suitable circuitry (not shown) extending thereto from the air outlet openings 60 of the lower block 50.

Figure 3:
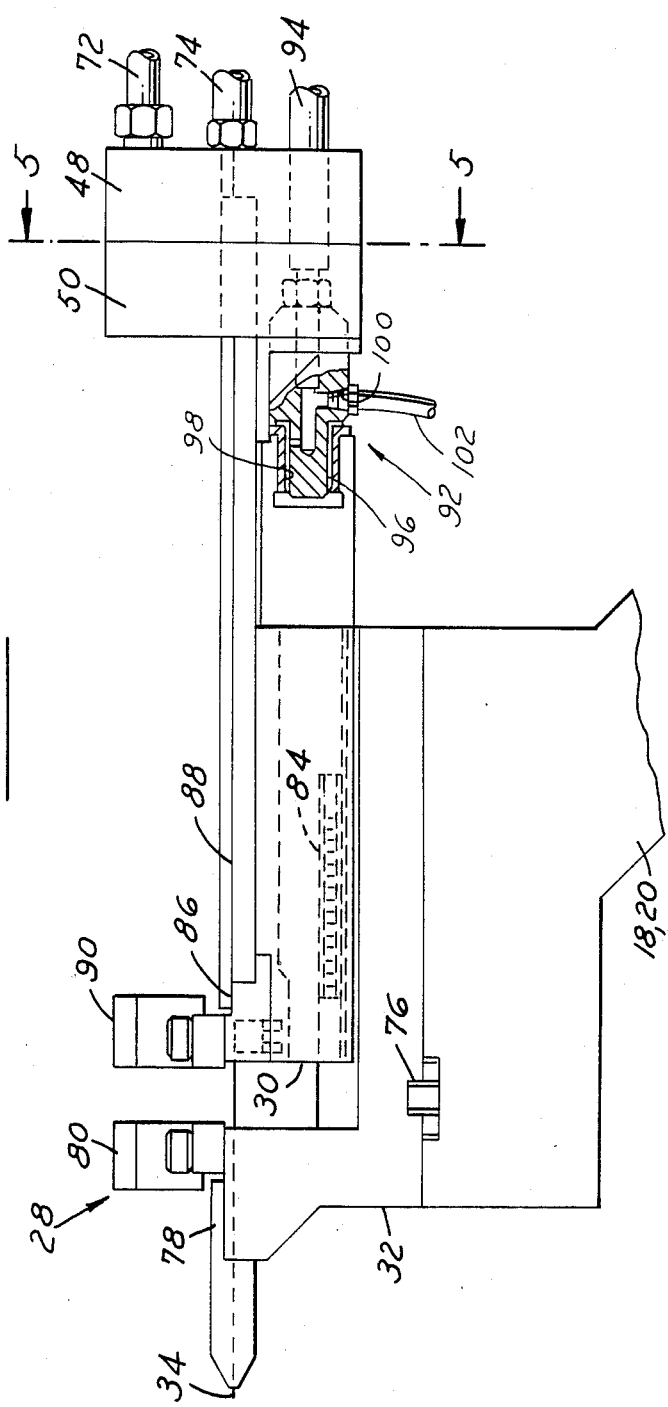
FIG. 3 is an enlarged view of a portion of the FIG. 1 structure.

As shown in FIG. 3, an automatic coupler device 92 serves to permit quick coupling of the magazine plate 30 to the cylinder rod 94 of the cylinder 46 FIG. 1). The rod 94 is adapted to move a suitable expandable connector or bladder member 96 into an opening 98 of the coupler device 92, after which hydraulic fluid which enters via an inlet opening 100 from a line 102 serves to expand the bladder member 96 to become solidly engaged with the walls of the opening 98.

Once either of the turrets 18 and 20 are rotated to bring a new cartridge assembly 28 into operational position beneath the upper block 48, the latter, which will have been retracted upwardly, is moved downwardly by the action of the cylinder 44 and the cylinder rod 74, to thereby slide the sleeves 56 into the openings 54 within the seal 57 and the male electrical connectors 70 into the openings 68. The cartridge assembly 28 is thus in operational position above the workpiece 36.

Referring once again to FIGS. 1 and 2, the D.C. servo motor 42 serves to move the support member 26 and associated turret assemblies 18 and 20 along the Z axis, including the cartridge assemblies 28, as a unit, to thereby urge the electrodes 34 into respective workpieces 36 with current through the contact blocks 48 and 50 serving to cause the electrodes 34 to function continuously to spark erode the desired opening or openings in the workpiece(s) 36, after which the D.C. servo motor 42 is reverse operated to retract the electrodes 34 from the workpiece(s) 36.

The cycle may be repeated on new workpieces 36 until the electrodes 34 become too worn to function properly, at which time the upper connector block 48 is retracted by the cylinder 44 from the lower connector block 50 and the expandable bladder 96 deflated and withdrawn by the cylinder 46. The turret 18 or 20 is then indexed to provide a fresh cartridge assembly 28 beneath the connector block 48 and the expandable bladder 96, which are quickly coupled to the block 50 and the opening 98 as explained above. Alternately, if a series of operations are to be performed on each workpiece 36, each of the cartridge assemblies 28 spaced around a turret 18 or 20 may include a different pattern of electrodes 34 and be indexed seriatim into position above the workpiece for performing the respective operational steps thereon.

Industrial Applicability

It should be apparent that the improved electrical discharge machine may include one or two turrets and operate on one workpiece or simultaneously on two workpieces. And, of course, each electrode cartridge assembly may include the same or a different electrode configuration.

It should also be apparent that, once the electrode of a particular cartridge assembly becomes worn, it may be quickly uncoupled and indexed away from a workpiece, whereupon it may be changed at the operator's leisure inasmuch as the next cartridge assembly is now in position above the workpiece and may be quickly coupled to the drive unit and to the electrical and pneumatic circuits.

While but one embodiment of the invention has been shown and described, other modifications thereof are possible within the scope of the following claims.

The embodiments of the invention in which an exclusive property or privilege is claimed are defined as follows:

1. An electrical discharge machine comprising a base frame having secured thereon a workpiece holding fixture adapted to hold an electrically conductive workpiece; an upright frame member mounted on said base frame; a support member slidably mounted on said upright frame member; a turret indexably mounted on said support member; a plurality of equally spaced electrode cartridge assemblies removably mounted on said turret, each of said cartridge assemblies including a wire guide plate secured to said turret and a magazine plate slidably mounted on said wire guide plate, an electrode guide secured to said wire guide plate, and at least one electrode extending from said magazine plate through said electrode guide; power means for moving said support member and turret and, hence, one of said cartridge assemblies and its at least one electrode into operational position with respect to the workpiece adapted to spark erode a desired opening therein; an upper connector block reciprocally mounted on said upright frame member; a lower connector block secured to each of said cartridge assemblies; first cylinder means mounted on said upright frame member and having its cylinder rod secured to said upper connector block for reciprocally moving said upper connector block into and out of contact with respective lower connector blocks for electrical and pneumatic communication therewith; second cylinder means mounted on said upright frame member and having an expandable bladder member formed on the cylinder rod thereof; a source of fluid under pressure for expanding said bladder member, an opening formed in said magazine plate for receiving said expandable bladder member to thereby fixedly secure said cartridge assembly for movement with said second cylinder means.

2. An electrical discharge machine comprising a base frame having secured thereon a workpiece holding fixture adapted to holding an electrically conductive workpiece; an upright frame member mounted on said base frame; a support member slidably mounted on said upright frame member; a plurality of equally spaced electrode cartridge assemblies operatively connected to said support member, each of said cartridge assemblies including at least one electrode extending therefrom; drive means for moving said support member and, hence, one of said cartridge assemblies and its at least one electrode toward and away from the workpiece; a source of air and electricty; a cylinder; and coupling means for operatively disconnecting and connecting said respective electrode cartridge assemblies to said cylinder and for alternately separating and then communicating air and electricity from said source when there is a need to change cartridge assemblies and electrodes, said coupling means including a first connector block secured to each of said cartridge assemblies, a second connector block, and second cylinder means having said second connector block connected thereto for reciprocally moving said second connector block with respect to said first connector block.

3. The electrical discharge machine described in claim 2, wherein said first and second connector blocks include interconnecting electrical contacts and openings for communication of air therebetween from a source of air under pressure.

4. An electrical discharge machine comprising a base frame having secured thereon a workpiece holding fixture adapted to holding an electrically conductive workpiece; an upright frame member mounted on said base frame; a support member slidably mounted on said upright frame member; a turret indexably mounted on said support member; a plurality of equally spaced electrode cartridge assemblies removably mounted on said turret, each of said cartridge assemblies including at least one electrode extending therefrom; drive means for moving said support member and turret and, hence, one of said cartridge assemblies and its at least one electrode toward and away from the workpiece; a source of air and electricity; a cylinder; and coupling means for operatively disconnecting and connecting said respective electrode cartridge assemblies to said cylinder and for alternately separating and then communicating air and electricity from said source when there is a need to change cartridge assemblies and electrodes, said coupling means including an expandable bladder member formed on the end of said cylinder, hydraulic means for expanding said expandable bladder member, and an opening formed in said magazine plate, said cylinder serving to insert said expandable member into said opening prior to the expansion of said expandable member by said hydraulic means to thereby operatively connect said cartridge assembly to said cylinder.

5. The electrical discharge machine described in claim 4, and a wire guide plate secured to said turret, a magazine plate slidably mounted on said wire guide plate, an electrode guide secured to said wire guide plate, and at least one opening formed in said electrode guide, wherein said at least one electrode extends from said magazine plate through said at least one opening.

* * * * *